(12) United States Patent
Magolan et al.

(10) Patent No.: US 11,535,254 B2
(45) Date of Patent: Dec. 27, 2022

(54) HYBRID/ELECTRIC VEHICLE CONTROL SYSTEM

(71) Applicant: FORD GLOBAL TECHNOLOGIES, LLC, Dearborn, MI (US)

(72) Inventors: Allen Magolan, Brighton, MI (US); Zachary John Sinisi, Westland, MI (US); Francis Thomas Connolly, Ann Arbor, MI (US); Paul Stephen Bryan, Saline, MI (US); Minku Lee, Ypsilanti, MI (US); Jason Wroblewski, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 725 days.

(21) Appl. No.: 16/437,722

(22) Filed: Jun. 11, 2019

(65) Prior Publication Data

US 2020/0391740 A1 Dec. 17, 2020

(51) Int. Cl.
*B60W 30/182* (2020.01)
*B60K 6/547* (2007.10)
(Continued)

(52) U.S. Cl.
CPC ........... *B60W 30/182* (2013.01); *B60K 6/547* (2013.01); *B60W 20/00* (2013.01); *B60L 15/20* (2013.01);
(Continued)

(58) Field of Classification Search
CPC ...... B60W 10/06; B60W 10/08; B60W 10/10; B60W 20/00; B60W 20/13; B60W 20/30; B60W 30/182; B60W 2510/1005; B60W 2520/10; B60W 2520/125; B60W 2540/10; B60W 2540/103; B60W 2540/18; B60W 2710/08; B60W 2710/086; B60K 6/48; B60K 6/547; B60K 2006/4825; B60L 15/20; B60L 15/209; B60L 2240/42; B60L 2240/48; B60L 2250/28; B60Y 2200/91;
(Continued)

(56) References Cited

U.S. PATENT DOCUMENTS

| 5,898,282 A | 4/1999 | Drozdz et al. |
| 6,098,733 A * | 8/2000 | Ibaraki ............... B60W 50/029 701/55 |

(Continued)

*Primary Examiner* — James M McPherson
*Assistant Examiner* — Kyle J Kingsland
(74) *Attorney, Agent, or Firm* — David B Kelley; Brooks Kushman P.C.

(57) ABSTRACT

A vehicle includes a powertrain having an electric machine and a controller. The controller is programmed to, responsive to an accelerator pedal position exceeding a first threshold for a predetermined time period or a lateral acceleration of the vehicle being greater than a second threshold, transition the powertrain from a nominal driving mode to a performance driving mode. The controller is also programmed to, responsive to an increase in a steering wheel angle while in the nominal mode, maintain a power output of the electric machine at a driver demanded power defined (Continued)

by the accelerator pedal position. The controller is further programmed to, responsive to an increase in a steering wheel angle while in the performance driving mode, reduce a power output of the electric machine to less than the driver demanded power.

20 Claims, 3 Drawing Sheets

(51) Int. Cl.
*B60W 20/00* (2016.01)
*B60L 15/20* (2006.01)

(52) U.S. Cl.
CPC ....... *B60L 2240/42* (2013.01); *B60L 2240/48* (2013.01); *B60W 2510/1005* (2013.01); *B60W 2520/125* (2013.01); *B60W 2540/10* (2013.01); *B60W 2540/18* (2013.01); *B60W 2710/08* (2013.01); *B60Y 2200/91* (2013.01); *B60Y 2200/92* (2013.01); *B60Y 2300/182* (2013.01); *B60Y 2300/91* (2013.01)

(58) Field of Classification Search
CPC .......... B60Y 2200/92; B60Y 2300/182; B60Y 2300/91; Y02T 10/62; Y02T 10/64; Y02T 10/72
See application file for complete search history.

(56) References Cited

U.S. PATENT DOCUMENTS

| | | | |
|---|---|---|---|
| 6,116,368 A | 9/2000 | Lyons et al. | |
| 6,652,418 B1* | 11/2003 | Gutknecht-Stohr | B60W 30/1819 477/120 |
| 7,770,675 B2* | 8/2010 | Hayashi | B60K 6/46 180/65.265 |
| 8,612,113 B2* | 12/2013 | Gibson | B60W 30/18027 701/99 |
| 9,896,083 B2* | 2/2018 | Morita | B60K 6/48 |
| 10,053,103 B2 | 8/2018 | Bevan et al. | |
| 10,576,964 B2* | 3/2020 | Kumazaki | B60W 10/04 |
| 2012/0179317 A1* | 7/2012 | Kuberczyk | B60W 20/11 180/65.265 |
| 2019/0241173 A1* | 8/2019 | Suzuki | B60W 10/08 |
| 2021/0101581 A1* | 4/2021 | Terai | B62J 43/16 |
| 2021/0207666 A1* | 7/2021 | Bucknor | B60W 10/08 |

* cited by examiner

HYBRID/ELECTRIC VEHICLE CONTROL SYSTEM

TECHNICAL FIELD

The present disclosure relates to hybrid/electric vehicles and control systems for hybrid/electric vehicles.

BACKGROUND

Hybrid/electric vehicles may include electric machines that are configured to propel the vehicle.

SUMMARY

A vehicle includes a powertrain having an electric machine and a controller. The controller is programmed to, responsive to an accelerator pedal position exceeding a first threshold for a predetermined time period or a lateral acceleration of the vehicle being greater than a second threshold, transition the powertrain from a nominal driving mode to a performance driving mode. The controller is also programmed to, responsive to an increase in a steering wheel angle while in the nominal mode, maintain a power output of the electric machine at a driver demanded power defined by the accelerator pedal position. The controller is further programmed to, responsive to an increase in a steering wheel angle while in the performance driving mode, reduce a power output of the electric machine to less than the driver demanded power.

A vehicle includes a powertrain having an electric machine that is configured to deliver power to a step-ratio transmission and a controller. The controller is programmed to, responsive to an accelerator pedal position exceeding a first threshold for a predetermined time period or a lateral acceleration of the vehicle being greater than a second threshold, transition the powertrain from a nominal driving mode to a performance driving mode. The controller is also programmed to, responsive to a transmission upshift while in the nominal driving mode, adjust a power output of the electric machine to a driver demanded power defined by the accelerator pedal position. The controller is further programmed to, responsive to a transmission upshift while in the performance driving mode, adjust a power output of the electric machine to less than the driver demanded power.

A vehicle includes a powertrain having an electric machine that is configured to deliver power to a step-ratio transmission and a controller. The controller is programmed to, responsive to an accelerator pedal position exceeding a first threshold for a predetermined time period or a lateral acceleration of the vehicle being greater than a second threshold, transition the powertrain from a nominal driving mode to a performance driving mode. The controller is also programmed to, responsive to transitioning to the performance driving mode from the nominal driving mode, increase shift points of the transmission relative to vehicle speed.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
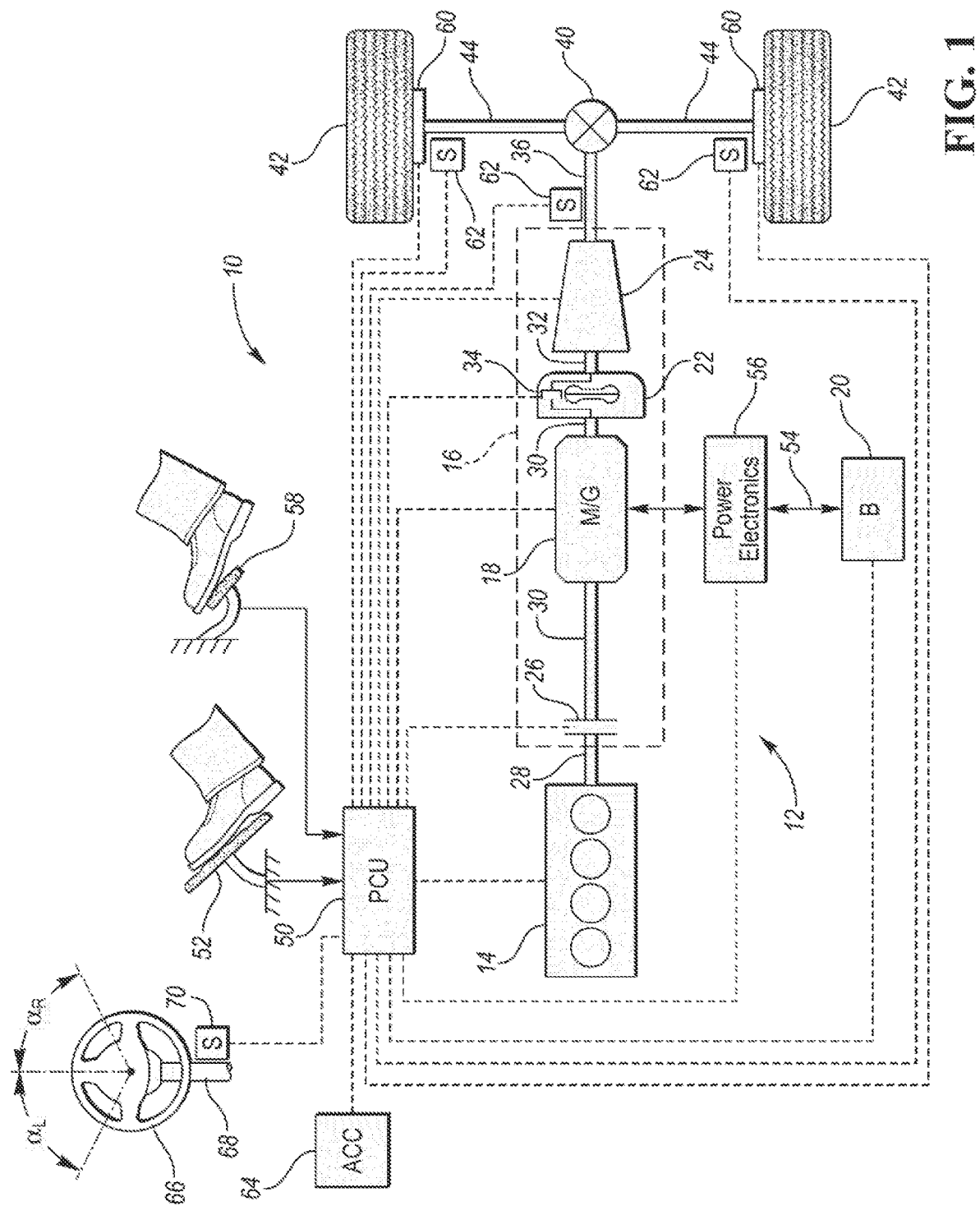
FIG. 1 is a schematic illustration of an exemplary powertrain of a hybrid/electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 When a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure.

For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. Further depressing the accelerator pedal 52 corresponds to a demand for increased power while releasing the accelerator pedal 52 corresponds to a demand for decreased power. Full depression of the accelerator pedal 52, which may be referred to as a wide-open accelerator pedal (WOP), may correspond to a maximum demand for power while full release of the accelerator pedal may correspond to a minimum demand for power. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands a desired torque and/or power output to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

Speed sensors 62 may be disposed about the transmission output shaft 36 and/or axles 44. The speed sensors are configured to detect the rotational speeds of the output shaft 36 and axles 44 and to communicate the rotational speeds to the controller 50. The rotational speeds detected by the sensors 62 may be converted into the linear speed of the vehicle 10 by taking into account any gear ratio between the respective shaft or axle and the wheels 42 and by taking into account the radius of the wheels 42. An algorithm may be stored within the controller 50 that is configured to convert the rotational speed detected by of any of the sensors 62 into the linear speed of the vehicle 10.

The vehicle may also include an additional sensor 64, such as an accelerometer, that is configured to detect any lateral acceleration of the vehicle 10. Sensor 64 is configured to communicate any detected lateral acceleration of the vehicle to the controller 50.

The vehicle 10 also includes a steering wheel 66 that is connected to a steering column 68. The steering wheel 66 and column 68 are connected to a pair of steered wheels (not shown) by various linkages and steering mechanisms, such as a rack and pinion (not shown). When an operator turns the steering wheel 66 to either the left or to the right form a resting or neutral position, the steered wheels are in turn turned to the left or to the right, respectively. When the steering wheel 66 is in the resting or neutral position, the steered wheels are pointed straight so that the vehicle 10 does not turn. A steering position sensor 70 may be secured to the steering column 68. The steering position sensor 70 is configured to detect the angle of the steering wheel to the left, $\alpha_L$, relative to the resting or neutral position or the angle of the steering wheel to the right, $\alpha_R$, relative to the resting or neutral position. The steering position sensor 70 is then configured to communicate the angle of the steering wheel to the controller 50.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Performance driving may involve periods of sustained high powertrain torque and power output which may involve long periods of wide-open accelerator pedal (WOP), short periods of high deceleration and braking, and/or frequent and sustained high cornering lateral forces. In a hybrid or electric vehicle, the electrified drive system (e.g., M/G 18 and battery 20) may be able to sustain power output for only a limited time based on the battery capacity, as indicated by the battery state of charge (SOC).

Hybrid powertrain systems may cycle between periods of using positive electrified drive power (power out of the battery 20, reducing SOC) for electric only propulsion. (EV driving), acceleration power assist (e.g., a hybrid mode where the engine 14 and M/G 18 are both providing power), or electric boost (during high accelerator pedal 52 demand), and periods of negative electrified drive power (power into the battery 20, increasing SOC) for regenerative braking and charging (e.g., a mode where the engine 14 powers the M/G 18 to recharge the battery 20). The SOC of the battery 20 will cycle up and down during these cycles of positive and negative electrified drive in a usable SOC range to increase the overall system driving cycle efficiency relative to an internal combustion engine only vehicle. SOC usable range will have a maximum and minimum. The maximum refers to a SOC where the controller 50 will no longer permit battery charging. The minimum refers to a SOC where the controller 50 will no longer permit battery depletion. Occasionally under normal driving conditions the minimum and maximum SOC limits may be reached. When the minimum and maximum SOC limits are reached, the control system may be designed to take mitigating actions (i.e., reducing the output of the M/G 18 relative to driver demand) to not exceed these limits while also maintaining propulsion of the vehicle 10. These occasions, where the battery SOC is at or near the minimum and maximum SOC, are not typically sustained for long periods of time. The SOC typically returns to the normal up and down cycling of the battery SOC after reaching the minimum or maximum SOC limits. However, if for some reason the battery SOC remains at or near the minimum and maximum SOC for an extending period of time (e.g. when the vehicle 10 is traveling along very long up or down grade, especially while towing or while the vehicle is loaded with cargo) then the vehicle will continue driving with the SOC range limit mitigation actions in place.

During periods of performance driving, maximum positive powertrain output demand occurs for much longer periods of time than during periods of typical or normal driving, and there is typically much less time and opportunity to recharge the battery 20, which usually occurs during reduced or zero accelerator pedal driving or during braking. The control system is typically designed to provide maximum powertrain output during wide-open pedal accelerator demand, which means maximum engine power plus maximum electrified drive power. Longer periods of maximum powertrain output during periods of performance driving reduces the SOC of the battery 20 at a high rate. This combined with less opportunities to recover energy to recharge the battery 20 during periods of performance driving may result in the usable range of the SOC of the battery 20 being quickly depleted, resulting in the control system controlling the powertrain with the SOC range limit mitigation actions in place, which results in reduced power output of the powertrain relative to driver demand. Continued driving in the mitigated state will tend to keep the SOC of the battery 20 at or near the minimum limit, resulting in the vehicle remaining in the mitigated state. This situation may limit the ability to sustain performance driving and the ability to recover (i.e., to recharge the battery 20 so that the M/G 18 can be operated at the driver demanded power) in order to return to the desired performance levels during performance driving. The current application implements various controls to maintain SOC levels of the battery 20 and to recharge the battery 20 during performance driving in order to maximize performance driving and reduce the implementations of the SOC range limit mitigation actions.

Figure 2:
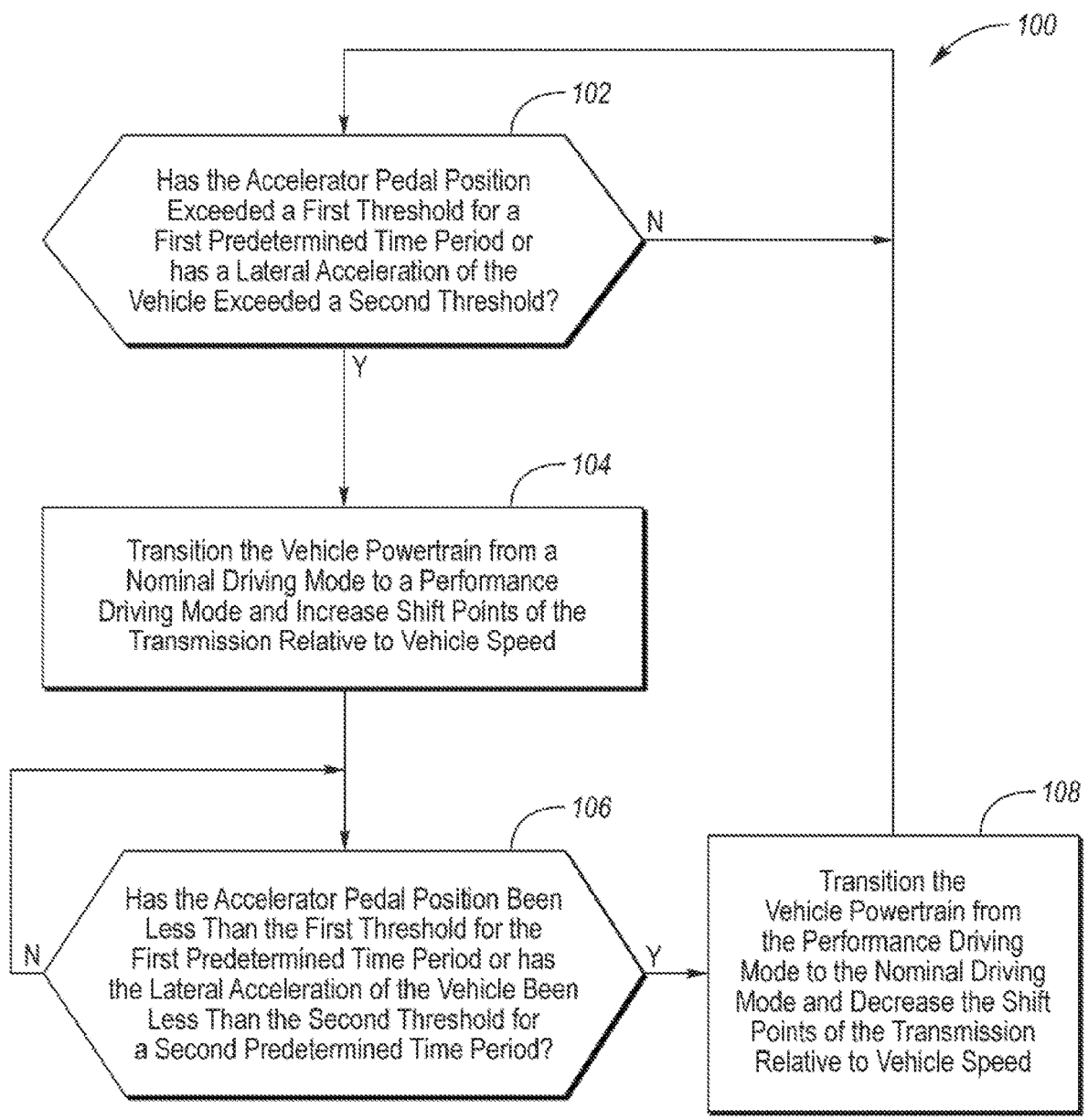
FIG. 2 is a flowchart illustrating a method of transitioning a powertrain of a hybrid/electric vehicle between nominal and performance driving modes.

Referring to FIG. 2, a flowchart of a method 100 of transitioning a powertrain (e.g., powertrain 12) of a hybrid/electric vehicle (e.g., vehicle 10) between nominal and performance driving modes is illustrated. The method 100 may be stored as control logic and/or an algorithm within the controller 50. The controller 50 may implement the method 100 by controlling the various components of the vehicle 10. The method 100 begins at block 102 with the powertrain 12 of the vehicle 10 in the nominal mode. The method may be initiated by turning on the ignition of the vehicle 10. The controller 50 may automatically place the powertrain 12 of the vehicle 10 in the nominal mode upon initially turning on the vehicle 10 via the ignition. At block 102, it is determined if the accelerator pedal position of the vehicle 10 has exceeded a first threshold for a first predetermined time period or if a lateral acceleration of the vehicle 10 has exceeded a second threshold. If the accelerator pedal position has not exceeded the first threshold for the first predetermined time period or if the lateral acceleration of the vehicle 10 has not exceeded the second threshold, the method 100 recycles back to the beginning of block 102 and the vehicle powertrain remains in the nominal mode.

If the accelerator pedal position has exceeded the first threshold for the first predetermined time period or if the lateral acceleration of the vehicle 10 has exceeded the second threshold at block 102, the method 100 moves on to block 104 where the controller 50 transitions the powertrain 12 of the vehicle 10 from the nominal driving mode to a performance driving mode. Also, at block 104 the shift points of the transmission 24 (i.e., the point at which the transmission changes gears or changes gear ratios) relative to vehicle speed may be increased when the powertrain 12 transitions to the performance driving mode relative to the shift points of the transmission 24 when operating in the nominal mode. Raising the shift points relative to vehicle speed, including the upshift points and the downshift points, while in the performance driving mode permits enhanced use of higher power output of the powertrain during acceleration and braking. For example, the raised shift points allow sustaining higher engine and motor speed which increases regenerative braking power and charging of the battery 20.

Next, the method 100 moves on to block 106, where it is determined if the accelerator pedal position of the vehicle 10 has been at a position that is less than the first threshold for the first predetermined time period or if a lateral acceleration of the vehicle 10 has been less than the second threshold for a second predetermined time period. If the accelerator pedal position has not been less than the first threshold for the first predetermined time period or if the lateral acceleration of the vehicle 10 has not been less than the second threshold for the second predetermined time period, the method 100 recycles back to the beginning of block 106. It should be noted that the first threshold, second threshold, and first predetermined time period described in block 106 may have the same or different values with respect to the first threshold, second threshold, and first predetermined time period described in block 102.

If the accelerator pedal position has been less than the first threshold for the first predetermined time period or if the lateral acceleration of the vehicle 10 has been less than the second threshold for the second predetermined time period at block 106, the method 100 moves on to block 108 where the controller 50 transitions the powertrain 12 of the vehicle 10 from the performance driving mode to the nominal driving mode. Also, at block 108 the shift points of the transmission 24 relative to vehicle speed are decreased back to the original shift points of the transmission 24 that correspond to the powertrain 12 operating in the nominal mode. The method 100 then returns to the beginning of block 102. It should be understood that the flowchart in FIG. 2 is for illustrative purposes only and that the method 100 should not be construed as limited to the flowchart in FIG. 2. Some of the steps of the method 100 may be rearranged while others may be omitted entirely.

Figure 3:
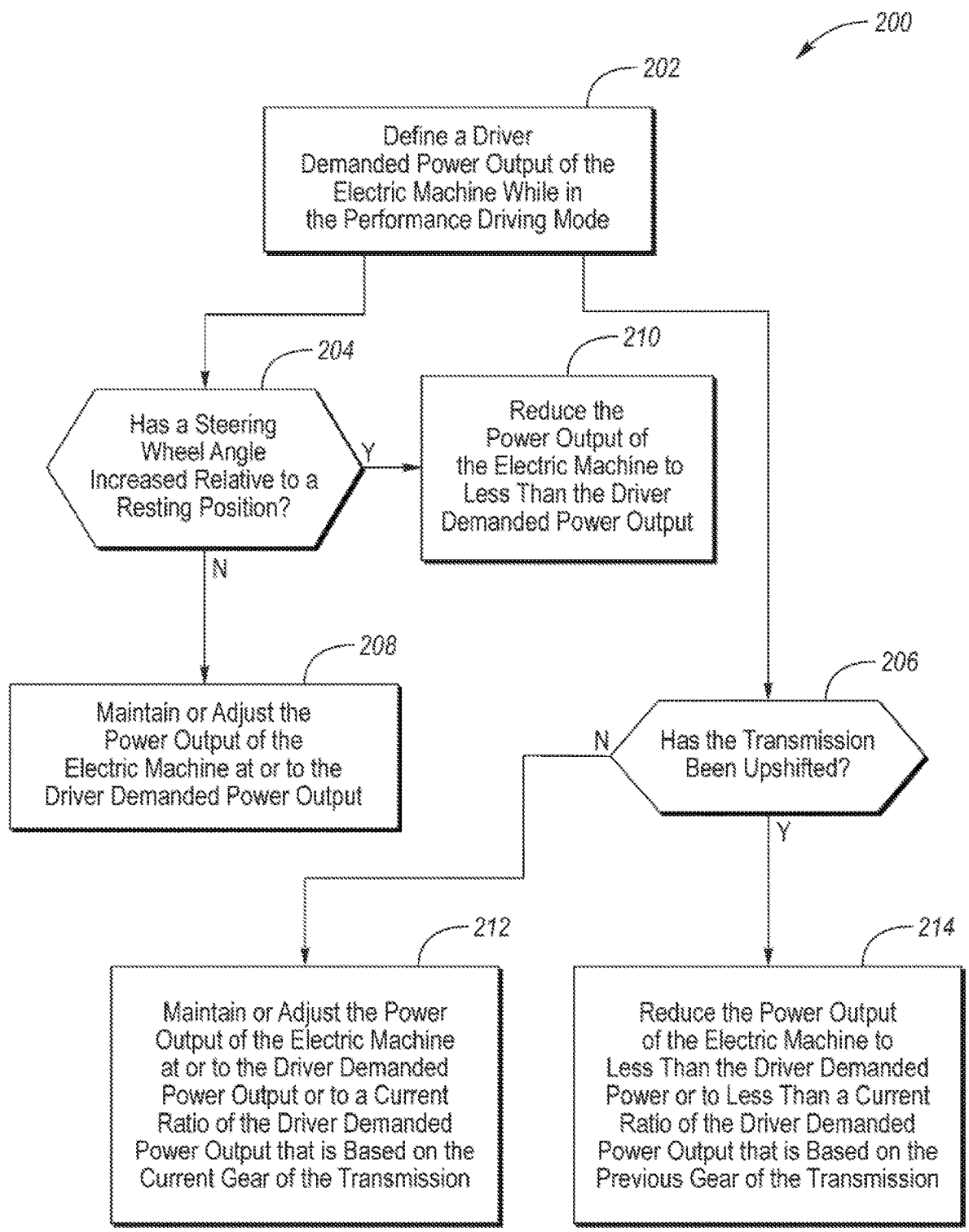
FIG. 3 is a flowchart illustrating a method of controlling the powertrain of a hybrid/electric vehicle in the performance driving mode.

Referring to FIG. 3, a flowchart of a method 200 of controlling the powertrain (e.g., powertrain 12) of a hybrid/electric vehicle (e.g., vehicle 10) while in the performance driving mode is illustrated. The method 200 may be stored as control logic and/or an algorithm within the controller 50. The controller 50 may implement the method 200 by controlling the various components of the vehicle 10. Once the powertrain 12 of the vehicle 10 has transitioned into the performance driving mode, as illustrated by method 100, a driver demanded power output of the electric machine (e.g., M/G 18) is defined at block 202. More specifically, the driver demanded power output of the electric machine is defined by a position of the accelerator pedal 52. If the vehicle is an electric only vehicle that includes an electric machine but not an internal combustion engine, the controller of the vehicle may include one or more algorithms that correlate the position of the accelerator pedal to the driver demanded power output of the electric machine, which is then commanded to the electric machine. If the vehicle is a hybrid vehicle that has a powertrain that includes both an electric machine (e.g., M/G 18) and an internal combustion engine (e.g., engine 14), the controller of the vehicle may include one or more algorithms that interpret the desired power output of the powertrain based the position of the accelerator pedal and distributes that desired power output between the electric machine and engine based on several factors, such as the desired total power output of the powertrain, the SOC of the battery powering the electric machine, the power output limits of the engine and electric machine, etc. The distributed desired power output is then commanded via the controller to the engine and the electric machine if they form a desired power output of the engine and a desired power output of the electric machine, respectively.

Once a desired output of electric machine has been defined at block 202, method 200 moves on to block 204 and block 206. At block 204 is determined if a steering wheel angle (e.g. $\alpha_L$ or $\alpha_R$ of steering wheel 66) has increased relative to the resting or neutral position. If the steering wheel angle has not increased relative to the resting or neutral position, the method 200 moves on to block 208 where the power output of the electric machine is maintained at or adjusted to the driver demanded power output of the electric machine. If the steering wheel angle has increased relative to the resting or neutral position, the method moves on to block 210 where the power output of the electric machine is reduced to less than the driver demanded power output of the electric machine. Alternatively, at blocks 204, 208, and 210, the method 200 may be configured to reduce the power output of electric machine only after the steering wheel angle has exceeded a threshold from the resting or neutral position. Furthermore, at blocks 204, 208, and 210, the reduction in the power output of the electric machine relative to the driver demanded power output of the electric machine may increase as the angle of the steering wheel increases relative to the resting or neutral position or relative to the threshold from the resting or neutral position. For example, the power output of the electric machine may have a ratio relative to the driver demanded power output of the electric machine that decreases incrementally from one and zero as the steering wheel angle increases from the resting or neutral position to an upper threshold or from the threshold from the resting or neutral position to the upper threshold.

It should be noted that the controller 50 may be programmed to only reduce the power output of the electric machine relative to the driver demanded power output of the electric machine according to blocks 204, 208, and 210 when in the performance driving mode. In other words, the controller 50 may be programmed to not reduce the power output of the electric machine relative to the driver demanded power output of the electric machine in response to an increase in the steering wheel angle when in the nominal driving mode. More specifically, while in the nominal driving mode, the controller 50 may be programmed to maintain or adjust the power output of the electric machine to the driver demanded power output of the electric machine in response to any change in the steering wheel angle.

During cornering (i.e., while driving on a curve in the road) a large amount of energy of a vehicle may be lost to friction at the tires. Therefore, increasing the torque of the electric machine during high driver demand while cornering may result in negligible gains regarding performance aspects (e.g., lap time or cornering speed of the vehicle). By reducing the power output of the electric machine relative to steering wheel angle according to blocks 204, 208, and 210, battery power may be saved for instances where increasing the power output of the electric machine is more beneficial for performance driving, such as when the vehicle is driving on a straightaway.

At block 206 is determined if the transmission (e.g., transmission 24) of the vehicle has been upshifted (i.e., has the transmission shifted from a lower gear to a higher gear). If the transmission has not been up shifted the method 200 moves on to block 212 where the power output of the electric machine is maintained at or adjusted to the driver demanded power output of the electric machine or is maintained at or adjusted to a current ratio of the driver demanded power output of the electric machine that is based on the current gear of the transmission. If the transmission has been upshifted, the method 200 moves on to block 214 where the power output of the electric machine is reduced to less than the driver demanded power output of the electric machine or to less than current ratio of the driver demanded power output of the electric machine that is based on the previous gear of the transmission. This allows a reduction in torque of the electric machine, and thus power usage of the electric machine, in higher gears where the transmission ratio is less favorable to acceleration. This helps to prevent depletion of the battery that powers the electric machine while accelerating in higher gears of the transmission, which in turn increases the available battery power for the lower gears, where the transmission ratio is more favorable to acceleration, while in the performance driving mode.

Furthermore, at blocks 206, 212, and 214, the reduction in the power output of the electric machine relative to the driver demanded power output of the electric machine or to the current ratio of the driver demanded power output of the electric machine may increase with each upshift in the transmission. However, the reduction in the power output of the electric machine relative to the driver demanded power output of the electric machine or to the current ratio of the driver demanded power output of the electric machine may decrease with each downshift in the transmission. For example, the power output of the electric machine may have a ratio relative to the driver demanded power output of the electric machine that decreases incrementally from one and zero with each shift of the transmission. As another example, if the transmission has eleven forward gears (this is just an example, the transmission may have any number of forward gears), the ratio of the power output of the electric machine to the driver demanded power output of the electric machine may have the following ratios in each gear: $1^{st}$ gear—1.0, $2^{nd}$ gear—0.9, $3^{rd}$ gear—0.8, $4^{th}$ gear—0.7, $5^{th}$ gear—0.6, $6^{th}$ gear—0.5, $7^{th}$ gear—0.4, $8^{th}$ gear—0.3, $9^{th}$ gear—0.2, $10^{th}$ gear—0.1, and $11^{th}$ gear—0.0.

It should be noted that the controller 50 may be programmed to only reduce (during upshifts) or increase (during downshifts) the power output of the electric machine relative to the driver demanded power output of the electric machine according to blocks 206, 212, and 214 when in the performance driving mode. In other words, the controller 50 may be programmed to not reduce or increase the power output of the electric machine relative to the driver demanded power output of the electric machine in response to an upshift or a downshift, respectively, in the transmission. More specifically, while in the nominal driving mode, the controller 50 may be programmed to maintain or adjust the power output of the electric machine to the driver demanded power output of the electric machine in response to any upshift or downshift. It should be understood that the flowchart in FIG. 3 is for illustrative purposes only and that the method 200 should not be construed as limited to the flowchart in FIG. 3. Some of the steps of the method 200 may be rearranged while others may be omitted entirely.

Also, while it the performance driving mode, the controller 50 may be programmed to increase or maximize charging of the battery 20 when the accelerator pedal 52 is not being fully depressed (i.e., when the accelerator pedal is at a position that is less than WOP). More specifically, the controller may be programmed to operate the electric machine (e.g., M/G 18) to recharge the battery 20 when the accelerator pedal is less than fully depressed while in the performance driving mode. The electric machine may be powered by either the engine (e.g., engine 14) or by regenerative braking. The engine and electric machine torque may be commanded via the controller 50 to charge the battery 20 at the maximum possible power permitted by the battery charge power limit and the available electric machine and engine power that is not being used to propel the vehicle 10. This charging algorithm may be calibrated to charge at the maximum possible power capability at any given time when accelerator pedal is at a position of less than WOP. This calibration permits the SOC of the battery 20 to rise to near the maximum of the allowed SOC operating range. If the vehicle stops or is driven at less than high performance levels during the performance driving mode, the SOC will recover at an increased rate allowing the powertrain quickly return to perform performance driving maneuvers. The performance driving exit strategy (i.e., the transition from the performance driving mode to the nominal driving mode described in method 200) may be arranged to allow maximum charging for some period after ceasing high performance driving in case high performance driving commences again.

It should be understood that the designations of first, second, third, fourth, etc. for thresholds, time periods, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a powertrain having an engine and an electric machine, each configured to generate and deliver power to a transmission to propel the vehicle; and
a controller programmed to,
in a nominal driving mode, operate both the engine and the electric machine to propel the vehicle;
in a performance driving mode, operate both the engine and the electric machine to propel the vehicle, wherein (i) a collective power output of the engine and the electric machine is greater in the performance driving mode than in the nominal driving mode and (ii) shift points of the transmission relative to vehicle speed are greater in the performance driving mode than in the nominal driving mode;

responsive to an accelerator pedal position exceeding a first threshold for a predetermined time period or a lateral acceleration of the vehicle being greater than a second threshold, transition the powertrain from the nominal driving mode to the performance driving mode, responsive to an increase in a steering wheel angle while in the nominal mode, maintain a power output of the electric machine at a driver demanded power defined by the accelerator pedal position, and responsive to an increase in a steering wheel angle while in the performance driving mode, reduce a power output of the electric machine to less than the driver demanded power.

2. The vehicle of claim 1 further comprising a step-ratio transmission, and wherein the controller is further programmed to, responsive to a transmission upshift while in the nominal driving mode, adjust a power output of the electric machine to a driver demanded power defined by the accelerator pedal position, and responsive to a transmission upshift while in the performance driving mode, adjust a power output of the electric machine to less than the driver demanded power.

3. The vehicle of claim 1, wherein the controller is further programmed to, responsive to transitioning to the performance driving mode from the nominal driving mode, increase shift points of the transmission relative to vehicle speed.

4. The vehicle of claim 1, wherein the controller is further programmed to, responsive to transitioning to the nominal driving mode from the performance driving mode, decrease shift points of the transmission relative to vehicle speed.

5. The vehicle of claim 1, wherein the controller is further programmed to, responsive to the accelerator pedal position being less than the first threshold for a second predetermined time period, transition the powertrain from the performance driving mode to the nominal driving mode.

6. The vehicle of claim 1, wherein the controller is further programmed to, responsive to the lateral acceleration of the vehicle being less than the second threshold for a second predetermined time period, transition the powertrain from the performance driving mode to the nominal driving mode.

7. The vehicle of claim 1 further comprising a battery, and wherein the controller is further programmed to, responsive to an accelerator pedal being less than fully depressed while in the performance driving mode, operate the electric machine to recharge the battery.

8. A vehicle comprising:
a powertrain having an engine and an electric machine, each configured to deliver power to a step-ratio transmission to propel the vehicle; and
a controller programmed to,
in a nominal driving mode, operate both the engine and the electric machine to propel the vehicle;
in a performance driving mode, operate both the engine and the electric machine to propel the vehicle, wherein (i) a collective power output of the engine and the electric machine is greater in the performance driving mode than in the nominal driving mode and (ii) shift points of the transmission relative to vehicle speed are greater in the performance driving mode than in the nominal driving mode;
responsive to an accelerator pedal position exceeding a first threshold for a predetermined time period or a lateral acceleration of the vehicle being greater than a second threshold, transition the powertrain from the nominal driving mode to the performance driving mode, responsive to a transmission upshift while in the nominal driving mode, adjust a power output of the electric machine to a driver demanded power defined by the accelerator pedal position, and responsive to a transmission upshift while in the performance driving mode, adjust a power output of the electric machine to less than the driver demanded power.

9. The vehicle of claim 8, wherein the controller is further programmed to, responsive to an increase in a steering wheel angle while in the nominal mode, maintain a power output of the electric machine at a driver demanded power defined by the accelerator pedal position, and responsive to an increase in a steering wheel angle while in the performance driving mode, reduce a power output of the electric machine to less than the driver demanded power.

10. The vehicle of claim 8, wherein the controller is further programmed to, responsive to transitioning to the performance driving mode from the nominal driving mode, increase shift points of the transmission relative to vehicle speed.

11. The vehicle of claim 8, wherein the controller is further programmed to, responsive to transitioning to the nominal driving mode from the performance driving mode, decrease shift points of the transmission relative to vehicle speed.

12. The vehicle of claim 8, wherein the controller is further programmed to, responsive to the accelerator pedal position being less than the first threshold for a second predetermined time period, transition the powertrain from the performance driving mode to the nominal driving mode.

13. The vehicle of claim 8, wherein the controller is further programmed to, responsive to the lateral acceleration of the vehicle being less than the second threshold for a second predetermined time period, transition the powertrain from the performance driving mode to the nominal driving mode.

14. The vehicle of claim 8 further comprising a battery, and wherein the controller is further programmed to, responsive an accelerator pedal being less than fully depressed while in the performance driving mode, operate the electric machine to recharge the battery.

15. A vehicle comprising:
a powertrain having an engine and an electric machine, each configured to deliver power to a step-ratio transmission to propel the vehicle; and
a controller programmed to,
in a nominal driving mode, operate both the engine and the electric machine to propel the vehicle;
in a performance driving mode, operate both the engine and the electric machine to propel the vehicle, wherein (i) a collective power output of the engine and the electric machine is greater in the performance driving mode than in the nominal driving mode and (ii) shift points of the transmission relative to vehicle speed are greater in the performance driving mode than in the nominal driving mode;
responsive to an accelerator pedal position exceeding a first threshold for a predetermined time period or a lateral acceleration of the vehicle being greater than a second threshold, transition the powertrain from the nominal driving mode to the performance driving mode, and responsive to transitioning to the performance driving mode from the nominal driving mode, increase shift points of the transmission relative to vehicle speed.

16. The vehicle of claim 15, wherein the controller is further programmed to, responsive to transitioning to the nominal driving mode from the performance driving mode, decrease shift points of the transmission relative to vehicle speed.

17. The vehicle of claim 15, wherein the controller is further programmed to, responsive to an increase in a steering wheel angle while in the nominal mode, maintain a power output of the electric machine at a driver demanded power defined by the accelerator pedal position, and responsive to an increase in a steering wheel angle while in the performance driving mode, reduce a power output of the electric machine to less than the driver demanded power.

18. The vehicle of claim 15, wherein the controller is further programmed to, responsive to a transmission upshift while in the nominal driving mode, adjust a power output of the electric machine to a driver demanded power defined by the accelerator pedal position, and responsive to a transmission upshift while in the performance driving mode, adjust a power output of the electric machine to less than the driver demanded power.

19. The vehicle of claim 15, wherein the controller is further programmed to, responsive to the lateral acceleration of the vehicle being less than the second threshold for a second predetermined time period, transition the powertrain from the performance driving mode to the nominal driving mode.

20. The vehicle of claim 15 further comprising a battery, and wherein the controller is further programmed to, responsive an accelerator pedal being less than fully depressed while in the performance driving mode, operate the electric machine to recharge the battery.

* * * * *